: US 7,276,192 B2
(45) Date of Patent: Oct. 2, 2007

(12) United States Patent
Hansen et al.

(54) COMPRESSING GROWTH MEDIUM POTS

(75) Inventors: Lars Hansen, Vejen (DK); Oejvind Ellegaard, Esbjerg (DK)

(73) Assignee: Ellegaard A/S, Esbjerg N (DK)

( * ) Notice: Subject to any disclaimer, the term of this patent is extended or adjusted under 35 U.S.C. 154(b) by 363 days.

(21) Appl. No.: 10/533,126

(22) PCT Filed: Oct. 30, 2003

(86) PCT No.: PCT/DK03/00731

§ 371 (c)(1),
(2), (4) Date: Apr. 29, 2005

(87) PCT Pub. No.: WO2004/039145

PCT Pub. Date: May 13, 2004

(65) Prior Publication Data

US 2006/0048448 A1    Mar. 9, 2006

(30) Foreign Application Priority Data

Oct. 30, 2002    (DK) .............................. 2002 01649

(51) Int. Cl.
*B29C 31/06*    (2006.01)
*B29C 43/08*    (2006.01)

(52) U.S. Cl. ........................ 264/109; 264/118; 264/120; 425/297; 425/356; 47/74

(58) Field of Classification Search ..................... None
See application file for complete search history.

(56) References Cited

U.S. PATENT DOCUMENTS

| 3,842,537 A * | 10/1974 | Bishop ........................... 47/74 |
| 3,883,989 A | 5/1975 | Melvold |
| 5,382,403 A | 1/1995 | Ellegaard |
| 2004/0049980 A1 * | 3/2004 | Principe et al. ................. 47/64 |
| 2006/0231451 A1 * | 10/2006 | Takeda et al. ........... 206/524.1 |
| 2007/0033871 A1 * | 2/2007 | Kelly et al. ............... 47/58.1 R |

FOREIGN PATENT DOCUMENTS

| GB | 860216 | 2/1961 |
| NL | 9101263 A | 2/1993 |

* cited by examiner

*Primary Examiner*—Mary Lynn Theisen
(74) *Attorney, Agent, or Firm*—David S. Safran

(57) ABSTRACT

The present invention concerns an apparatus and a method for making and compressing growth medium pots, where the growth medium pots are made as a growth medium pipe, where a tubular wall is formed by the fibre-containing material, where the growth medium pipe contains slightly compressed growth medium. It is the purpose of the invention to achieved an apparatus and a method for cheap and efficient production of firmly compressed growth medium pots, where the growth medium pots are rapidly and efficiently compressed contained in the fibre-containing material. This may be achieved with an apparatus as described in the introduction, if the apparatus is designed so that the end of the growth medium pipe is disposed in an opening in a revolving unit by transport means, where the opening in the revolving unit can be surrounded by at least a wall and a bottom, where means for cutting is separating the individual growth means pot from the growth medium pipe, where the revolving unit is rotated between a number of stop positions, where at least one stop position interacts with a cylinder unit at least including a pressing cylinder with connection to at least one piston, where the piston interacts with one of the openings of the revolving unit, where the growth medium pot contained in the opening of the revolving unit is compressed by the piston with an advancing movement, where at least one of the stop positions of the revolving unit interacts with an ejector cylinder that is connected with a piston which is pressing a finished growth medium pot out of an opening in the revolving unit. Hereby may be attained a very rapid and simultaneously very uniform compression of growth medium pots. By compressing growth medium pots, the air content is reduced without affecting the other contents of the growth medium pot. During transport and storage, a reduction in volume is very essential.

10 Claims, 3 Drawing Sheets

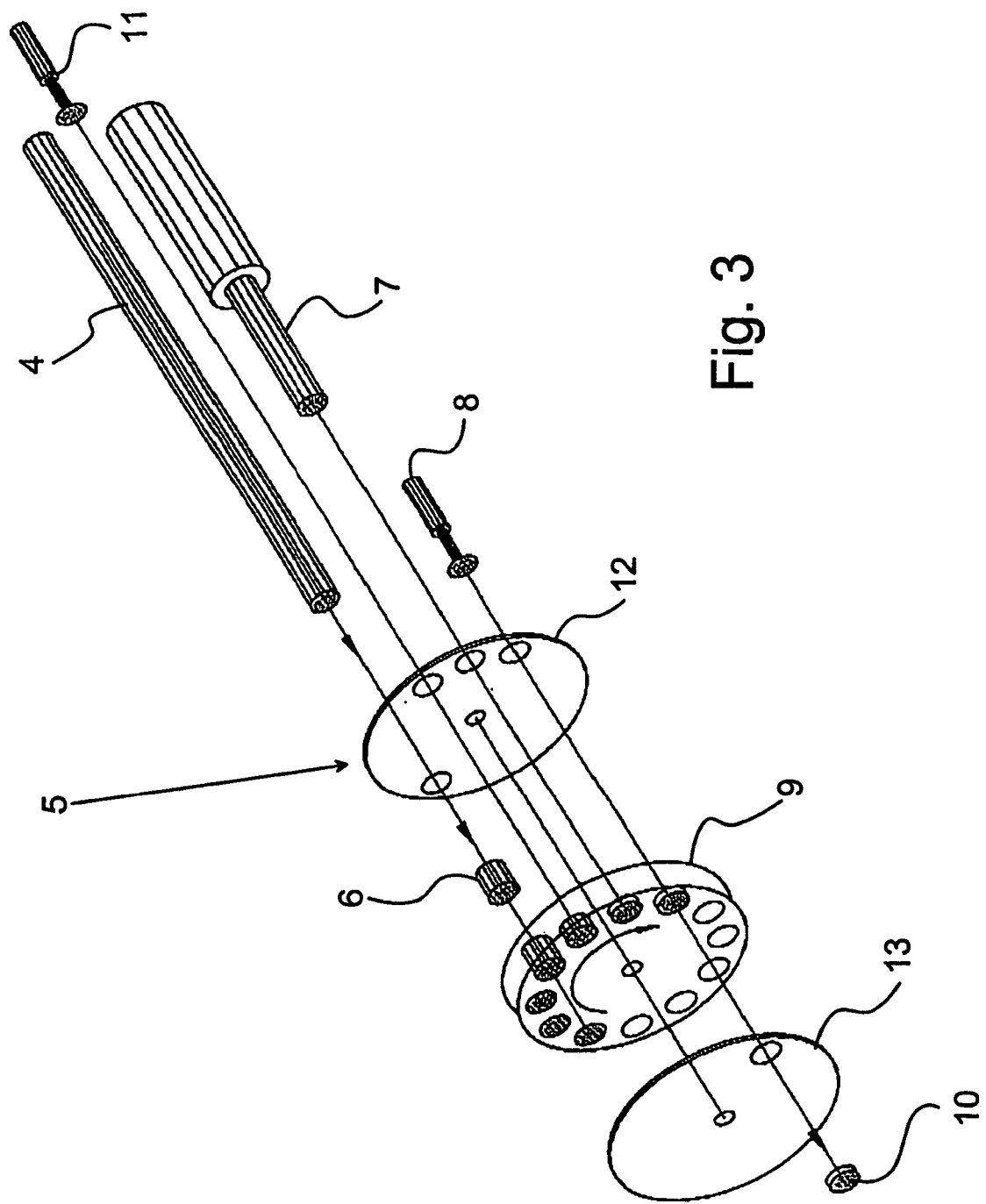

COMPRESSING GROWTH MEDIUM POTS

Figure 1:
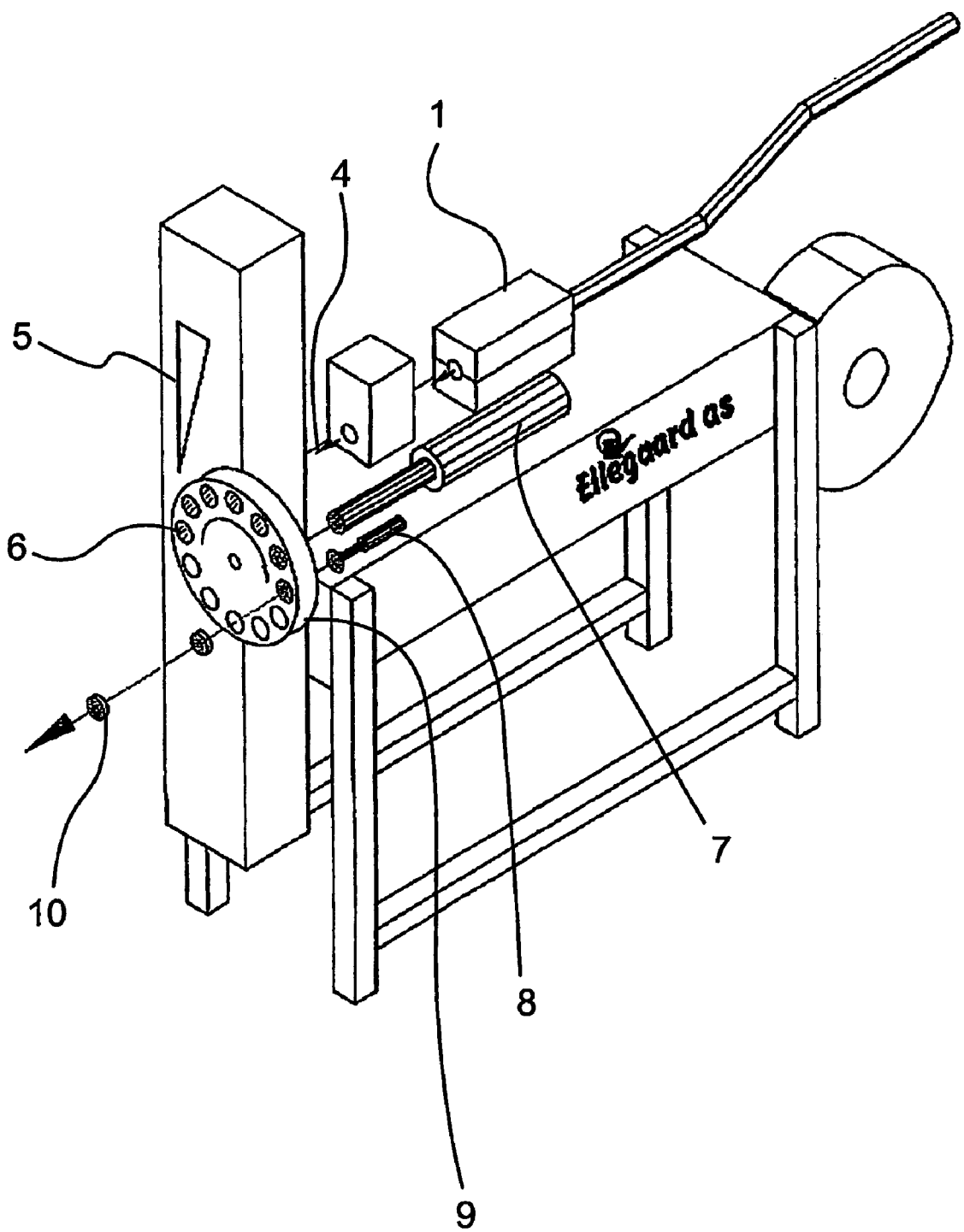

The present invention concerns an apparatus for making and compressing growth medium pots, where the growth medium pots contains slightly compressed growth medium, where the growth medium pots are made as a growth medium pipe, where a pipe wall is formed by a fibre-containing material, where the growth medium pipe contains slightly compressed growth medium.

The invention also concerns a method for making and compressing growth medium pots where the growth medium pots are formed by loosely compressed growth medium which are surrounded at the side by at least one layer of fibre-containing material, where the fibre-containing material forms a tube surrounding the loosely compressed growth medium.

U.S. Pat. No. 3,375,607 discloses a pot of compressed plant growth medium expanding by contact with water into a porous loose material with increasing volume, which is surrounded by a casing compressing the pot for attaining reduced size under transport and storage, but which may be expanded to a volume which is large enough for germinating plants. The casing may consist of a plastic net which is pressed against the pot and forms it. Typically, pot and casing are expanded four to six times from storage to situation of use.

U.S. Pat. No. 3,883,989 discloses growing plants in expanded sphagnum pots that are produced by mixing an aqueous bitumen emulsion with sphagnum in a critical ratio, drying the mixture and performing compression in several directions for shaping solid items. The compressed items have a thickness comprising only a small part of their original thickness. These items expand by contact with water into forming soft cakes that assume their shape without external support, but they allow normal plant and root growth. The expanded pot has a thickness which is approximately the original thickness before compression.

None of the above mentioned publications describe compressing growth medium pots in a way that can be used in practice. U.S. Pat. No. 3,375,607 discloses compressing sphagnum contained in a net by compression in a tool with a top part and a bottom part without any support on the sides of the sphagnum pot. Only by using a very rigid net, one may prevent a lateral expansion of the sphagnum pot during compression, and with great probability a part of the pot may become jammed between top and bottom parts of the tool. U.S. Pat. No. 3,883,989 uses a bitumen emulsion for holding together sphagnum in the desired shape. On the fact that bitumen is environmentally hazardous, it will be directly disadvantageous to use bitumen as growth medium for plants unless there is an environmentally safe way of disposing the sphagnum pots.

WO 92/03914 discloses a method and a system for making growth medium pots, where growth medium is sucked into a surrounding tube formed of a fibre-containing material by means of underpressure. In this way, loosely compressed growth medium pots are produced.

U.S. Pat. No. 6,455,149 B1 discloses pills that are water swelling and a method for making the pills. The pills are made of a growth medium which has been added various additives in the shape of means for pH adjustment, means facilitating water absorption, and means enabling making the pills by extrusion. At the same time, both fertilisers and insecticides are added. The pills are thus containing a number of environmentally damaging chemical compounds.

It is the purpose of the invention to achieved an apparatus and a method for cheap and efficient production of firmly compressed growth medium pots, where the production occurs with high speed and with high efficiency of energy.

This may be achieved with an apparatus as described in the introduction, if the apparatus is designed so that the end of the growth medium pipe is disposed in an opening in a revolving unit by transport means, where the opening in the revolving unit can be surrounded by at least a wall and a bottom, where means for cutting is separating the individual growth means pot from the growth medium pipe, where the revolving unit is rotated between a number of stop positions, where at least one stop position interacts with a cylinder unit at least including a pressing cylinder with connection to at least one piston, where the piston interacts with one of the openings of the revolving unit, where the growth medium pot contained in the opening of the revolving unit is compressed by the piston with an advancing movement, where at least one of the stop positions of the revolving unit interacts with an ejector cylinder that is connected with a piston which is pressing a finished growth medium pot out of an opening in the revolving unit.

Hereby may be attained a very rapid and simultaneously very uniform compression of growth medium pots. By compressing growth medium pots, the air content is reduced without affecting the other contents of the growth medium pot. During transport and storage, a reduction in volume is very essential. By using a revolving unit, a very rapid production may be achieved, and the revolving unit may be coupled with a machine for making normal, un-compressed growth medium pots.

The apparatus may also be designed so that the revolving unit interacts with a first and a second piston in at least two stop positions, where the first piston performs a first compression of a growth medium pot, where the second piston performs a second compression in a succeeding stop position for the revolving unit. By repeated compressing, an efficient, permanent deformation of the growth medium fibres is achieved, and thereby the compressed growth medium pots are remaining in the compressed state until the growth medium pot is soaked.

The openings of the revolving unit may advantageously communicate with at least one vacuum pump through at least one valve, where the valves open the connection to the vacuum pump during the pistons' compression of the growth medium pots. Hereby may be achieved a faster and more efficient compression, as an overpressure does not arise in the growth medium during the compression.

The pistons may advantageously include at least one projection for forming at least one implantation hole in the compressed growth medium pot. By all pistons being designed with the same projection, formation of an implantation hole is ensured by the first compression, and by the succeeding pistons also having projections that fill implantation holes so that these are not closed.

At least one of the projections of the pistons can interact with an associated opening in the opposite bottom of the revolving unit, where the piston can press growth medium through the bottom opening, where the growth medium pot can be compressed around the projection of the piston. Hereby may be achieved that an open through-going hole is formed in a growth medium pot. This hole may be particularly suited for germination of seed that may be disposed in the hole for germination between layers of hypergrowth medium. The through-going hole may contain one or more lesser growth medium pots that may be formed of a slightly compressed hyper-growth medium which is particularly suited for germination. Adaptation to individual types of seed may be effected by adapting growth medium composition in the internal growth medium pot or pots.

The succeeding pistons for compressing may advantageously contain projections for preventing compression of holes at the subsequent compression. Hereby may be ensured that the formed holes remain open at the subsequent compression.

Advantageously, the growth medium pipe, which contains loosely compressed growth medium, may be conveyed through a medium cylinder, where between the growth medium cylinder and the revolving unit there is a slot, where a saw cuts through the growth medium cylinder by passing through the slot. Hereby may be achieved an efficient support of the growth medium pipe wall during cutting, and the amount of growth medium that may be lost by cutting through is substantially reduced.

Advantageously, the revolving unit may be disposed between a first disc and a second, stationary disc, where the discs close the openings in the revolving unit, where the first disc includes at least one hole for ejecting, where the second disc includes at least one hole for insertion of the growth medium cylinder, where the second disc includes at least one hole for a compression piston, where the second disc includes at least one hole that interacts with the piston of the ejector.

The invention may include a method, where the front end of the pipe may be disposed in a rotating revolving unit, where the tube may be cut off before the revolving unit is rotated from a first working position to a succeeding working position, where at least one piston is performing a first compression of the growth medium pot after which the revolving unit is rotated to a succeeding working position where an ejector cylinder performs ejection of the compressed growth medium pot. Hereby may be achieved a rapid and optimal production in terms of energy of growth medium pots.

During compression of the growth medium pot, advantageously there may be formed a hole by pushing out growth medium in connection with compression, where the formed hole is filled with at least one smaller pot formed by a hyper growth medium, where the smaller pot is surrounded by a fibre-containing material. Hereby may be achieved that an internal hyper growth medium pot, which is particularly suited for germination, is formed, and which is surrounded by a pot formed of a growth medium adapted for optimal growth of a tender plant. The external pot may contain an internal pot which is considerably lower than the surrounding pot. The surface of the inner pot may be used for germination of plants that are suited for germination on an open surface. Protected by a surrounding side of a growth medium, ideal germination conditions for different seeds can be provided. Seeds that require germination in darkness may be covered by a thin layer of sand, where the seeds under the sand layer will be protected as indicated.

In a second embodiment, the hole in the external pot may be filled by a slightly compressed hyper growth medium which is particularly suited for germination of seeds. Among a large number of suited growth mediums, some examples may be mentioned: ground coco fibres, perlite, vermiculite.

Figure 2:
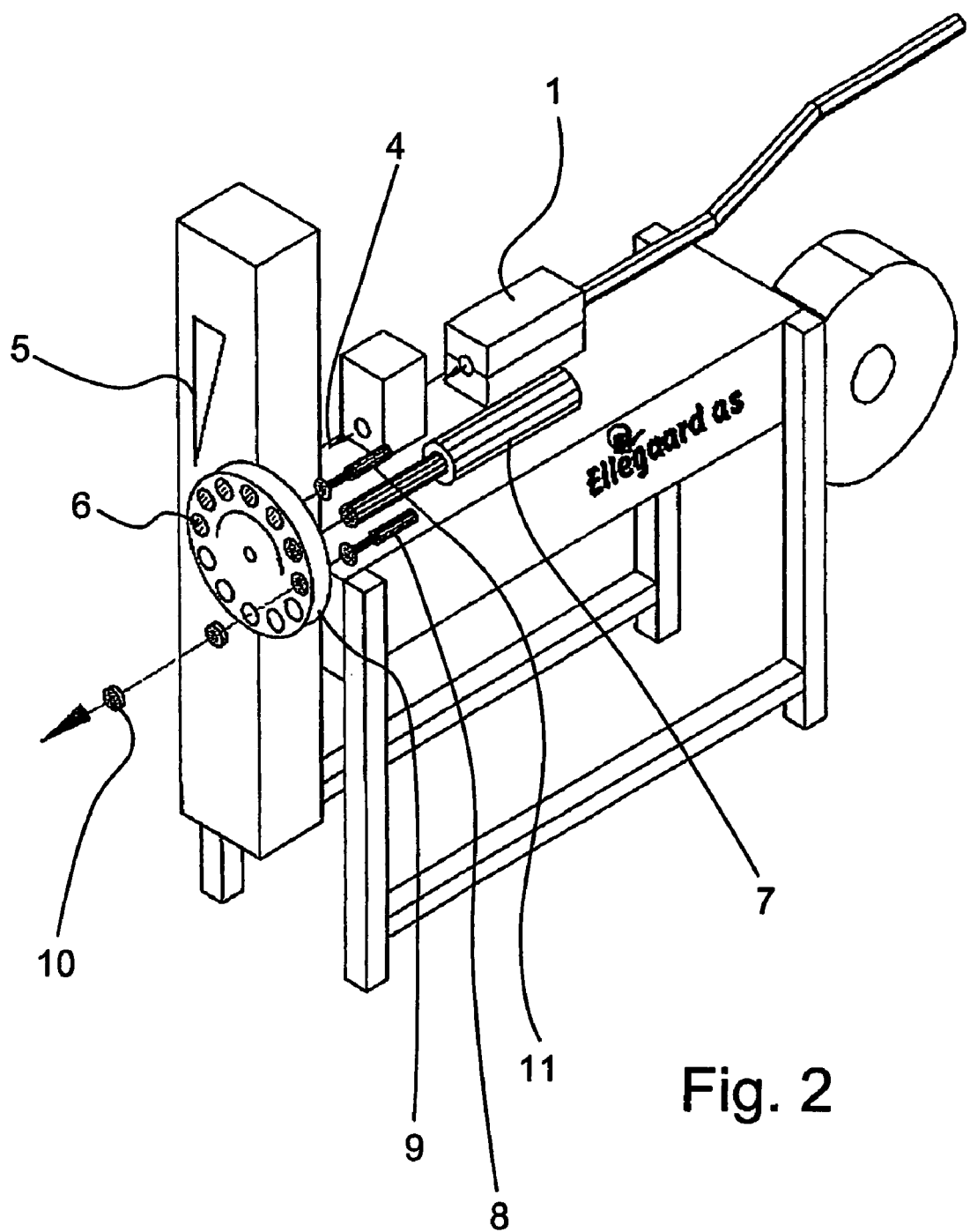

In the following, the invention is explained with reference to drawings where:

FIG. 1 shows a possible embodiment of an apparatus according to the invention, where FIG. 2 shows an alternative embodiment, where FIG. 3 shows an exploded view of FIG. 2.

On FIG. 1 is shown a possible embodiment of a machine for making growth medium pots. An automatic pot apparatus 1 is forming a tubular wall consisting of a fibre-containing material around an advancing stream of growth medium so that a growth medium pipe is formed. A more detailed description of what is occurring in the automatic pot apparatus 1 is found in WO 92/03914 which is also mentioned under the state of the art. The growth medium pipe is advanced through a not shown medium cylinder 4 against a saw 5 to a revolving unit 8, where the growth medium pipe is shortened by means of the saw 5. On the Figure is also shown a pressing cylinder 7 and an ejecting cylinder 8.

An un-compressed pot 6 is thus placed in the revolving unit 9 by advancing the growth medium pipe and by the saw 5 performing a cut through the growth medium pipe. Subsequently, the revolving unit 9 is rotated one position forward in the direction of the arrow to a succeeding position, after which a pressing cylinder 7 and an ejecting cylinder 8 are performing, possibly simultaneously at different positions, compression of one of the pots 6, while the ejecting cylinder 8 is pressing a finished pressed pot 10 out of the revolving unit 9. Since the individual sub-processes may be performed with very great speed, one may, by means of the revolving unit 9, achieve a very rapid production of compressed growth medium pots 10. The capacity of the revolving unit 9 and the two cylinders 7 and 8 may attain a pace so that this part of the machine is following the pace with which the automatic pot apparatus 1 can operate.

On FIG. 2 is shown an alternative embodiment, where the same reference numbers as on FIG. 1 are used, and therefore they are not mentioned. FIG. 2 only differs from FIG. 1 in that a further pressing cylinder 11 has been introduced.

By using two pressing cylinders 11, 7, repetition of the compression is achieved, but the number of compressions does not need to be delimited to two only, as more pressing cylinders may advantageously be used. The repeated compressing of growth medium pots means that the growth medium fibres attain more permanent deformation, i.e. the growth medium fibres are returning to their original shape to a lesser extent, and the growth medium pots may thus be compressed to a higher degree, and the finished growth medium pots become more uniform by the double compression, which is an advantage in packing and forwarding later.

FIG. 3 shows an exploded view of the revolving unit itself and the cylinders connected thereto. A medium cylinder 4, a saw 5 and an un-compressed growth medium pot 6 are shown. Simultaneously, a compressing cylinder 7, an ejecting cylinder 8, a rotating revolving unit 9 and a compressed growth medium pot 10 are shown. Likewise, a compressing cylinder 11 is shown. Also, there is shown a first stationary disc 13 and a second stationary disc 12.

The growth medium pipe 4 interacts with the second stationary disc 12 in which there is an opening for passage of the growth medium pipe which is shortened by means of a saw 5 operating between the revolving unit 9 and the stationary disc 12. The growth medium pot, now shortened, is transported in the rotating revolver unit to a first compressing position where pressing cylinder 11 performs a first compression of the growth medium pot. Subsequently, in next position for the revolving unit, pressing cylinder 7 performs a further compression of the growth medium pot, where the growth medium pot in the succeeding position of ejecting cylinder 8 is pressed out of the revolving unit and through an opening in the first stationary disc 13 so that a finished product 10 appears. The finished product 10 may then subsequently be placed in a packing by handling means, or possibly be packed in a container for further transport.

The invention may be extended to include a revolving unit that includes plural working chambers disposed radially in at least one inner and one outer ring, whereby a double revolving unit appears which can interact with double pistons, whereby the production capacity may be doubled.

Two revolving units may interact where a revolving unit is making an outer growth medium pot which in connection with ejection is placed in a subsequent revolving unit. The hole in the outer growth medium pot may here be filled with an internal hyper growth medium pot which is made and compressed inside the external pot.

As alternative thereto, the hole in the outer growth medium pot in the second revolving unit may be filled with a very loosely compressed hyper growth medium. Hereby may be formed optimal conditions for germination of seeds.

A revolving unit may be designed so that simultaneously there is produced large external growth medium pot with hole for receiving an internal pot, where the internal pot is made simultaneously.

In a possible alternative embodiment, the outer and the inner growth medium pot may be made inside each other. The external pot may be made at first with a hole for receiving the internal pot. After a slight compression, in a succeeding position for the revolving unit the hole of the external pot may be filled with an inner pot which may be conveyed in a second growth medium pipe having a diameter corresponding to the hole in the external growth medium pot. The internal pot may be cut off at a height corresponding to the height of the surrounding outer growth medium pot. The two pots may subsequently be compressed by a common piston, where the inner pot can be compressed more than the outer, so that a depression arises in the outer pot. The depression may, as mentioned, be used for germinating seed. In spite of the internal pot being lower than the surrounding pot, the hyper growth medium of the pot may be slightly compressed in order to improve the germinating ability of seed. This may be achieved in that the outer pot was compressed hard before the inner pot was formed in the hole in the outer pot.

The internal pot may be formed as a cylinder with a diameter around 15 mm which is surrounded by an external pot with an outer diameter of between 35 and 50 mm.

The invention claimed is:

1. An apparatus for making and compressing growth medium pots, where the growth medium pots contains slightly compressed growth medium, where the growth medium pots are made as a growth medium pipe surrounded by a tubular wall which is formed by a fibre-containing material, wherein the end of the growth medium pipe is disposed in an opening in a revolving unit by transport means, where the opening in the revolving unit is surrounded by at least a wall and a bottom, where means for cutting is separating the individual growth means pot from the growth medium pipe, where the revolving unit is rotated between a number of stop positions, where at least one stop position interacts with a cylinder unit at least including a pressing cylinder with connection to at least one piston, where the piston interacts with one of the openings of the revolving unit, where the growth medium pot contained in the opening of the revolving unit is compressed by the piston with an advancing movement, where at least one of the stop positions of the revolving unit interacts with an ejector cylinder that is connected with a piston which is pressing a finished growth medium pot out of an opening in the revolving unit.

2. Apparatus according to claim 1, wherein the revolving unit interacts with a first and a second piston in at least two stop positions, where the first piston performs a first compression of a growth medium pot, where the second piston performs a second compression in a succeeding stop position.

3. Apparatus according to claim 1, wherein the openings of the revolving unit communicates with at least one vacuum pump through at least one valve, where the valves open the connection to the vacuum pump during the pistons' compression of the growth medium pots.

4. Apparatus according to claim 1, wherein the pistons used include at least one projection for forming at least one transplanting hole in the compressed growth medium pot.

5. Apparatus according to claim 1, wherein at least one projection of the pistons interacts with an associated opening in the opposite bottom of the revolving unit, where the piston is pressing growth medium through the bottom opening, where the growth medium pot is compressed around the projection of the piston.

6. Apparatus according to claim 5, wherein the subsequent pistons for compressing include projections for preventing compression of holes at subsequent compressing.

7. Apparatus according to claim 1, wherein the pipe, which contains loosely compressed growth medium, is advanced through a medium cylinder, where between the growth medium cylinder and the revolving unit there is a slot, where a saw cuts through the growth medium cylinder by passing through the slot.

8. Apparatus according to claim 1, wherein the revolving unit is disposed between a first disc and a second, stationary disc, where the discs close the openings in the revolving unit, where the first disc includes at least one hole for ejecting, where the second disc includes at least one hole for insertion of the growth medium cylinder, where the second disc includes at least one hole for a compression piston, where the second disc includes at least one hole that interact with the piston of the ejector.

9. Method for making and compressing growth medium pots, where the growth medium pots are formed by loosely compressed growth medium which are surrounded at the side by at least one layer of fibre-containing material, where the fibre-containing material forms a tube surrounding the loosely compressed growth medium, wherein the front end of the tube is disposed in a rotating revolving unit, where the tube is cut off before the revolving unit is rotated from a first working position to a succeeding working position, where at least one piston is performing a first compression of the growth medium pot after which the revolving unit is rotated to a succeeding working position where an ejector cylinder performs ejection of the compressed growth medium pot.

10. Method according to claim 9, wherein during compression of the growth medium pot, a hole is formed by pushing out growth medium in connection with compression, where the formed hole is filled with at least one smaller pot formed by a hyper growth medium, where the smaller pot is surrounded by a fibre-containing material.

* * * * *